No. 816,944. PATENTED APR. 3, 1906.
J. W. SELF.
BALL BEARING CASTER.
APPLICATION FILED JAN. 19, 1905.

Witnesses:
Frank R. Glore
H. C. Rodgers

Inventor:
J. W. Self,
By George J. Thorpe
Atty.

UNITED STATES PATENT OFFICE.

JOHN W. SELF, OF KANSAS CITY, MISSOURI.

BALL-BEARING CASTER.

No. 816,944.   Specification of Letters Patent.   Patented April 3, 1906.

Application filed January 19, 1905. Serial No. 241,725.

*To all whom it may concern:*

Be it known that I, JOHN W. SELF, a citizen of the United States, residing at Kansas City, in the county of Jackson and State of Missouri, have invented certain new and useful Improvements in Ball-Bearing Casters, of which the following is a specification.

My invention relates to ball-bearing casters, and more particularly to that class for use upon chairs, beds, and other articles of furniture; and my object is to produce an efficient and reliable caster of simple, strong, durable, and comparatively inexpensive construction.

With this object in view the invention consists in certain novel and peculiar features of construction and organization, as hereinafter described and claimed, and in order that it may be fully understood reference is to be had to the accompanying drawings, in which—

Figure 1:
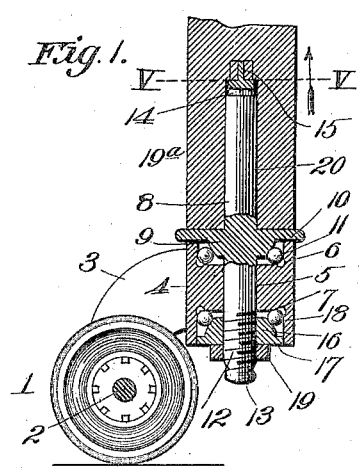
Figure 3:
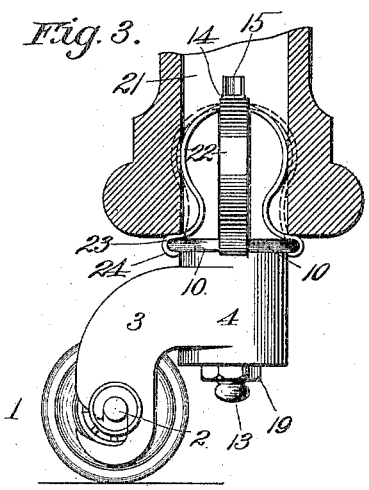
Figure 5:
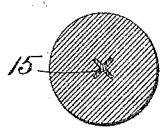
Figure 2:
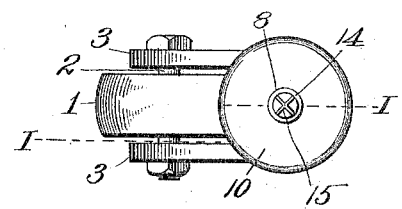
Figure 4:
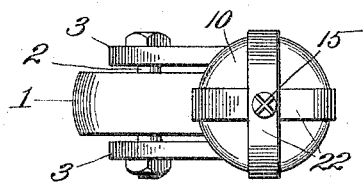

Figure 1 is a vertical section taken on the line I I of Fig. 2 and also shows the leg of a chair in section engaged by the caster. Fig. 2 is a top plan view of the caster. Fig. 3 is a side elevation of the caster equipped with a spring-frame for securing the caster to a bed-leg, shown in section. Fig. 4 is a top plan view of the caster shown in Fig. 3. Fig. 5 is a horizontal section on the line V V of Fig. 1.

In the said drawings, 1 designates a caster-wheel of the usual or any preferred type and journaled upon the axle 2 between the arms 3, carrying said axle, said arms 3 terminating in a vertically-disposed cylindrical head 4. The head 4 is by preference cast integral with arms 3 and is provided with a central vertical passage 5, opening at its upper end into a ball-race recess 7.

8 designates the stem of the caster, the same having secured rigidly thereto or by preference cast integral therewith the downwardly-disposed cone 9 to depend into recess 6, said cone having at its upper margin a flange 10, which overlies and projects marginally beyond the head 4, balls 11 upon the ball-races and engaged by the cone providing a bearing which operates with a minimum of friction. The lower portion of the stem is threaded, as at 12, and terminates in a head 13 of smaller diameter than the threaded portion. At its opposite end the stem is slightly reduced diametrically to provide the upwardly-disposed shoulder 14 and above said shoulder a skeleton angular portion, preferably comprising a series of radial outwardly-projecting arms 15.

16 designates a cone screwed upon the threaded portion of the stem and formed by preference with a flange 17, fitting snugly in recess 7 to prevent the entrance of dust as far as possible, and interposed between said cone-bearing 16 and the ball-race 7 are a series of balls 18, which, in conjunction with balls 11, head 4, and cones 9 and 16, constitute a ball-bearing connection which permits the caster to swivel with the least possible friction. To guard against the cone 16 working down upon the stem, a lock-nut 19 is also screwed upon the stem and bears against the lower side of said cone.

The device as thus far described is of that type which is to be driven into the socket formed to receive it in the chair-leg or its equivalent 19ª, the socket being numbered 20 and of length about equal to the stem between cone 9 and the skeleton portion 15.

In practice the parts of the caster are assembled by first slipping the lower portion of the stem down through head 4 until the cone 9 has nearly entered recess 6. The balls 11 are then slipped into said recess and the stem slipped downward until the cone engages the balls, as shown in Fig. 1. Said parts are then held in the relation described and inverted, so that the threaded cone 16 may be fitted upon the lower end of the threaded portion 12, after which the balls 18 are dropped into recess 7 and said cone 16 screwed home until the parts are as shown in the figure last referred to. The nut 19 is then screwed upon the stem to lock cone 16 in the position described. The stem is now fitted into socket 20 until the skeleton portion 15 reaches the end of the same. The operator with a hammer then strikes the reduced headed end 13 and drives the stem forward until the skeleton portion is embedded in the wood to lock the stem against rotative movement.

With furniture provided with a large socket 21 in the lower end of each leg I equip my caster with a spring-metal clamp-frame to hold it in said socket. This clamp-frame comprises a pair of crossed springs of knob shape in side view, so that the crossed or upper portions constitute a head 22 and the lower or flaring portions a base 23, the lower ends of the base being, furthermore, bent inwardly to form hooks 24. The crossed portions are fitted, as shown most clearly in Fig.

4, upon the reduced portion of the stem, so that the under one shall rest on shoulder 14 thereof, the hooks 24 being snapped into engagement with that portion of flange 10 which projects marginally beyond head 4. To secure a caster thus equipped to a bed-leg, the resilient frame 22 is forced up into the socket 21 and in such action is pressed tightly from the position shown by dotted to the position shown by full lines, Fig. 3, in which latter position it locks the caster-stem from rotatable action and leaves the head free to perform its swivel function. Is will also be noticed that the resilient frame is free to expand longitudinally upon the stem when forced into a bed-leg or its equivalent, because the length of the reduced portion of said stem is sufficient to accommodate such movement, the engagement of the spring and stem at this point being necessary only as a means of preventing lateral vibration of the stem, and consequently an unstable and unsatisfactory support for the article to which the caster is attached.

From the above description it will be apparent that I have produced a caster possessing the features of advantage enumerated as desirable and which obviously is susceptible of modification in minor particulars without departing from the principle of construction involved.

Having thus described the invention, what I claim as new, and desire to secure by Letters Patent, is—

1. A ball-bearing caster, comprising a roller, arms carrying the same and provided with an integrally-formed vertically-disposed head having ball-races at its upper and lower ends; a stem extending loosely through said head and provided with a rigid bearing-cone disposed downwardly and having a flange overlying said head; said stem having its lower end threaded and terminating below the latter in a head of smaller diameter than the threaded portion; a threaded cone engaging the threaded portion of the stem; a series of balls occupying each ball-race and engaged therein by their respective cones; a lock-nut engaging the threaded stem and the proximate cone; and a skeleton portion projecting from the upper end of the stem.

2. The combination of a roller, arms carrying the same, a head rigid with said arms and having recesses at its upper and lower ends, and a vertical passage connecting with said recesses, a stem extending through said passage and above and below said head and threaded at its lower end and provided with a skeleton portion at its extreme upper end, a cone rigid with the stem and depending into the upper recesses of the head, a cone screwed upon the lower portion of the stem and projecting up into the lower recess of the head, a lock-nut on the stem bearing against the lower side of the lower cone, and balls in said recesses engaged by said cones.

3. The combination of a vertical stem provided with a rigid horizontal flange, a caster having a head rotatably mounted upon the lower portion of the stem, below said flange and of smaller diameter than the latter, and a resilient frame fitting slidingly at its upper end on the stem and provided at its lower end with inwardly-disposed hooks engaging said flange peripherally and with a bowed portion between said hooks and the point of engagement with the stem.

4. The combination of a vertical stem provided with a rigid horizontal flange, a caster having a head rotatably mounted upon the lower portion of the stem below said flange and of smaller diameter than the latter, and a resilient frame, consisting of a pair of crossed springs each of knob shape in side view, and having their crossed or upper ends fitting slidingly on said stem, and their lower ends terminating in inwardly-disposed hooks engaging the periphery of said flange outward of the head of the caster.

In testimony whereof I affix my signature in the presence of two witnesses.

JOHN W. SELF.

Witnesses:
H. C. RODGERS,
G. Y. THORPE.